(12) United States Patent
Ogi (10) Patent No.: US 8,923,596 B2
(45) Date of Patent: Dec. 30, 2014

(54) METHOD FOR DETECTING DENSITY OF AREA IN IMAGE

(75) Inventor: Hiroshi Ogi, Kyoto (JP)

(73) Assignee: SCREEN Holdings Co., Ltd. (JP)

( * ) Notice: Subject to any disclaimer, the term of this patent is extended or adjusted under 35 U.S.C. 154(b) by 266 days.

(21) Appl. No.: 13/495,627

(22) Filed: Jun. 13, 2012

(65) Prior Publication Data

US 2013/0064422 A1 Mar. 14, 2013

(30) Foreign Application Priority Data

Sep. 8, 2011 (JP) ................................. 2011-196137

(51) Int. Cl.
*G06K 9/00* (2006.01)
*G06K 9/34* (2006.01)

(52) U.S. Cl.
CPC .............. *G06K 9/0014* (2013.01); *G06K 9/342* (2013.01)
USPC .......................................... 382/133; 382/274

(58) Field of Classification Search
CPC .................................................... G06T 15/506
See application file for complete search history.

(56) References Cited

U.S. PATENT DOCUMENTS

| 6,947,583 | B2 | 9/2005 | Ellis et al. |
| 7,050,620 | B2 | 5/2006 | Heckman |
| 7,120,282 | B2 | 10/2006 | Langan |
| 7,129,473 | B2 | 10/2006 | Ishihara et al. |
| 7,190,818 | B2 | 3/2007 | Ellis et al. |
| 7,262,858 | B2 | 8/2007 | Lin et al. |
| 7,283,654 | B2 | 10/2007 | McLain |
| 7,582,415 | B2 | 9/2009 | Straus |
| 7,718,131 | B2 | 5/2010 | Jiang |
| 8,135,203 | B2 | 3/2012 | Takagi et al. |
| 2003/0053699 | A1 | 3/2003 | Olsson .......................... 382/228 |
| 2003/0082516 | A1* | 5/2003 | Straus ............................... 435/4 |
| 2004/0160607 | A1* | 8/2004 | Lin et al. ........................ 356/445 |
| 2007/0273686 | A1* | 11/2007 | Watanabe et al. ............. 345/419 |
| 2009/0219419 | A1* | 9/2009 | Kawasaka ..................... 348/251 |
| 2010/0025567 | A1 | 2/2010 | Lueerssen |

FOREIGN PATENT DOCUMENTS

| JP | 09-145594 | 6/1997 |
| JP | 2005-347880 | 12/2005 |
| JP | 2007-017345 | 1/2007 |

(Continued)

OTHER PUBLICATIONS

Japanese Office Action issued Apr. 22, 2014 for corresponding Japanese Patent Application No. 2011-196137(3 pages).

*Primary Examiner* — Bhavesh Mehta
*Assistant Examiner* — Andrew Moyer
(74) *Attorney, Agent, or Firm* — Ostrolenk Faber LLP (57) ABSTRACT

Light is allowed to be incident from above wells provided on a microplate M and the light transmitted to the lower surface is received to obtain an original image of the wells (Step S101). Detection target areas in the original image are specified by an appropriate image processing (Step S102), and peripheral areas as backgrounds surrounding the respective detection target areas are specified (Step S103). By calculating a density value of the detection target area Ri using luminance information of the detection target area Ri and that of the peripheral area Si surrounding this detection target area Ri for each detection target area Ri (Steps S105, S106), the influence of a well wall surface reflected on the background is eliminated.

11 Claims, 7 Drawing Sheets

(56) References Cited

FOREIGN PATENT DOCUMENTS

| JP | 2008-64534 | 3/2008 |
|----|------------|--------|
| JP | 2008-112190 | 5/2008 |
| JP | 2008-123329 | 5/2008 |
| JP | 2010-268723 | 12/2010 |
| WO | 02/37158 | 5/2002 |

\* cited by examiner

METHOD FOR DETECTING DENSITY OF AREA IN IMAGE

CROSS REFERENCE TO RELATED APPLICATION

The disclosure of Japanese Patent Application No. 2011-196137 filed on Sep. 8, 2011 including specification, drawings and claims is incorporated herein by reference in its entirety.

BACKGROUND OF THE INVENTION

1. Field of the Invention

This invention relates to a technology for specifying an area which matches a predetermined condition from an image obtained by imaging a depressed part of a specimen holding plate and obtaining a density value of this area.

2. Description of the Related Art

In medical and bioscience experiments, a fluid (e.g. a culture fluid), culture media and the like are, for example, poured into depressed parts called wells of a plate-like device on which a multitude of wells are arrayed and cells or the like cultured here are observed. Such a device is called, for example, a microplate or a microtiter plate. For example, in the process of developing an anticancer drug, a multitude of samples obtained by causing various drugs to act on cells at different densities are observed and the life and death of the cells are judged. Various optical devices for supporting such observations have been conventionally proposed.

For example, in an optical apparatus disclosed in the description of U.S. Pat. No. 7,718,131, wells are imaged by irradiating light from above the wells and receiving light transmitted to a lower side. In this technology, an image of one well is reformed from a plurality of partial images imaged while light is irradiated in different manners to cope with a problem that the shadow of a side wall surface of the well is reflected on an image due to the incidence of light focused by a lens.

Even by an imaging method taking into account the influence of the wall surface of the depressed part as in the above conventional technology, it is difficult to completely eliminate this influence. Particularly, a method for accurately calculating a numerical value having the influence of a wall surface eliminated therefrom when it is tried to quantitatively calculate the image density of a specific area in an image has not yet been established.

SUMMARY OF THE INVENTION

This invention was developed in view of the above problem and an object thereof is to provide a technology capable of accurately calculating a density value of an area specified from an image obtained by imaging a depressed part of a specimen holding plate while eliminating the influence of the wall surface of the depressed part.

An aspect of the present invention is a density detection method for detecting a density value of an area having a peculiar optical property within an image, comprising: a first step of irradiating light from above a specimen holding plate including a plurality of light transmissive depressed parts and receiving the light transmitted to a lower side of the specimen holding plate, thereby imaging an original image including the depressed parts; a second step of specifying an area having an optical property different from surrounding as a detection target area from an image area corresponding to the depressed part of the original image; a third step of specifying a peripheral area surrounding the detection target area in the original image and obtaining luminance information of the peripheral area; and a fourth step of calculating a density value of the detection target area based on luminance information of the detection target area and luminance information of the peripheral area corresponding to the target area.

The influence of the wall surface of the depressed part appears in the original image as a variation of the background density of the original image obtained by imaging the depressed part. That is, the background densities of the detection target areas and their surrounding areas in the original image are influenced by the wall surface of the depressed part. Accordingly, even if images are those obtained by imaging the same target, the image densities of the targets differ depending on whether or not the images of the targets are influenced by the wall surface of the depressed part. Such a difference in the image density should occur also in the backgrounds of the respective targets.

In view of such knowledge, the density value of the detection target area is calculated based on the luminance information of the detection target area and that of the peripheral area of this detection target area in this invention. A degree of influence of the wall surface of the depressed part is thought to be about the same in the detection target area and its peripheral area. Accordingly, by reflecting the luminance information of the peripheral area in calculating the density value based on the luminance information of the detection target area, it is possible to calculate the density value of the detection target area by canceling the influence of the wall surface of the depressed part. That is, according to this invention, the density value of the detection target area specified from the image obtained by imaging the depressed part can be accurately calculated by eliminating the influence of the wall surface of the depressed part.

The above and further objects and novel features of the invention will more fully appear from the following detailed description when the same is read in connection with the accompanying drawing. It is to be expressly understood, however, that the drawing is for purpose of illustration only and is not intended as a definition of the limits of the invention.

DETAILED DESCRIPTION OF THE PREFERRED EMBODIMENTS

Figure 1A:
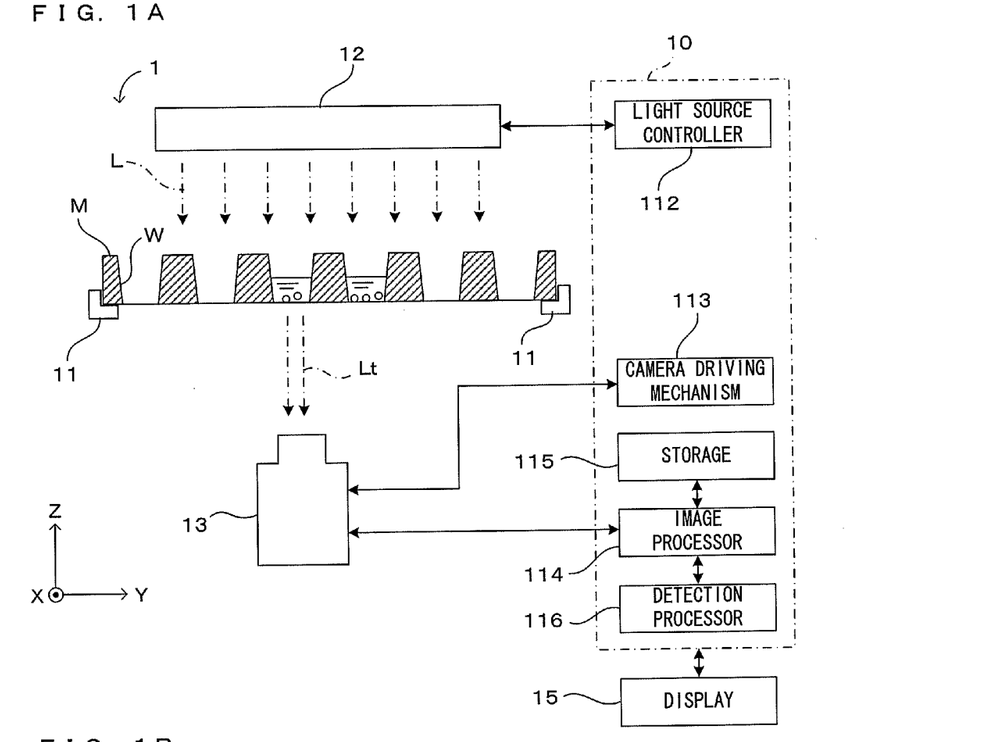
FIGS. 1A and 1B are diagrams which show schematic constructions of one aspect of a detecting apparatus to which this invention is applied.
Figure 1B:
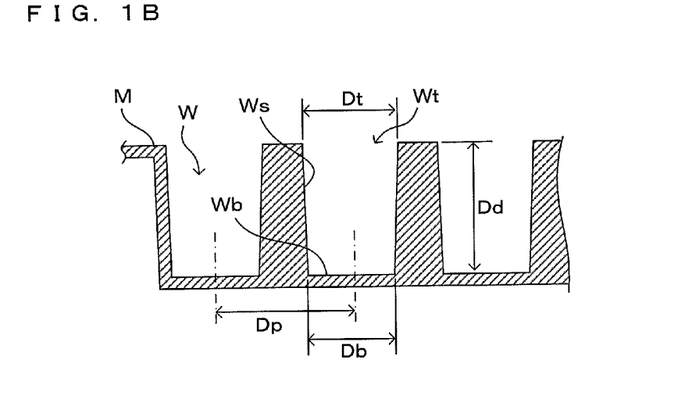

FIGS. 1A and 1B are diagrams which show schematic constructions of one aspect of a detecting apparatus to which this invention is applied. More specifically, the diagrams show a configuration example of a detecting apparatus to which one embodiment of a detection method according to this invention is applicable. As shown in FIG. 1A, this detecting apparatus 1 includes a holder 11 holding a sample (microplate) M formed with a plurality of, e.g. 96 (12×8 matrix array) wells W, into each of which a fluid such as a culture fluid, a culture medium or a reagent (only partly shown) is poured, in a substantially horizontal state by being held in contact with a peripheral edge part of the lower surface of this microplate M, a light source 12 provided above the holder 11, an imaging unit 13 provided below the holder 11, and a control unit 10 for performing a predetermined operation by controlling these. Coordinate axes are set as shown in FIG. 1A for the following description. An X-Y plane is a horizontal plane and a Z axis is a vertical axis.

The diameter and depth of each well W in the microplate M are typically about several mm. As an example, dimensions of each part of the microplate M used in experiments by the present inventors are shown. As shown in FIG. 1B, a diameter Dt of an opening Wt in an upper part of each well W is 6.69 mm, whereas an inner diameter Db of a well bottom surface Wb is 6.58 mm. As can be understood from these, an inner wall surface Ws of the well W is not a simple cylindrical surface, but an obliquely inclined tapered surface. Further, a depth Dd of the well W is 10.9 mm, and an arrangement pitch Dp of a plurality of wells W is 9 mm. Note that the dimensions of the respective parts are only examples and the dimensions of the microplate to be imaged by this detecting apparatus 1 are not limited to these, but arbitrary.

The light source 12, which is controlled by a light source controller 112 provided in the control unit 10, irradiates light L to a plurality of wells W at once from above the microplate M held on the holder 11 in response to a control command from the light source controller 112. Light to be irradiated is visible light, particularly preferably white light.

The imaging unit 13 functions as a camera for imaging an image of the microplate M by receiving transmitted light Lt emitted from the light source 12 and transmitted to a side below the microplate M. The imaging unit 13 is connected to a camera driving mechanism 113 provided in the control unit 10, and the camera driving mechanism 113 scans and moves the imaging unit 13 in the horizontal plane (X-Y plane) along the lower surface of the microplate M held on the holder 11.

That is, in this embodiment, the imaging unit 13 can move and scan along the lower surface of the microplate M. Note that although the imaging unit 13 moves relative to the microplate M here, it is sufficient to realize a relative movement between the imaging unit 13 and the microplate M. In this sense, the microplate M may be moved relative to the imaging unit 13.

Image data obtained by the imaging unit 13 is fed to an image processor 114. The image processor 114 performs a suitable image processing to the image data from the imaging unit 13 and a predetermined arithmetic processing based on the image data. Data before and after the processing is saved and stored in a storage 115 if necessary. Further, a detection processor 116 performs a detection processing, to which a detection method according to the present invention is applied, based on the image data processed by the image processor 114.

This detecting apparatus 1 also includes a display 15 for displaying an original image imaged by the imaging unit 13, an image processed by the image processor 114 and further a detection result obtained by the detection processing performed by the detection processor 116 and the like. An unillustrated receiving unit for receiving an operation input from an operator such as a keyboard, a touch panel or a tablet.

This detecting apparatus 1 can be used in an application in which optical images of imaging targets such as a fluid or the like held in the respective wells W and cells and the like included therein are imaged and a peculiar part having a predetermined optical characteristic, more specifically an optical property different from the fluid or the like held in the wells W is detected from the optical image using a difference in its optical property. For example, it can be suitably used for the purpose of imaging a culture fluid, cells being cultured and cell clumps (spheroids) as an imaging target and automatically detecting such cells and the like by further image processing. In this description, the "fluid and the like" is a collective term for fluids, gel-like or semi-fluid solid substances and substances that are, for example, poured into the wells in a fluid state and then solidified such as soft agar.

Figure 2A:
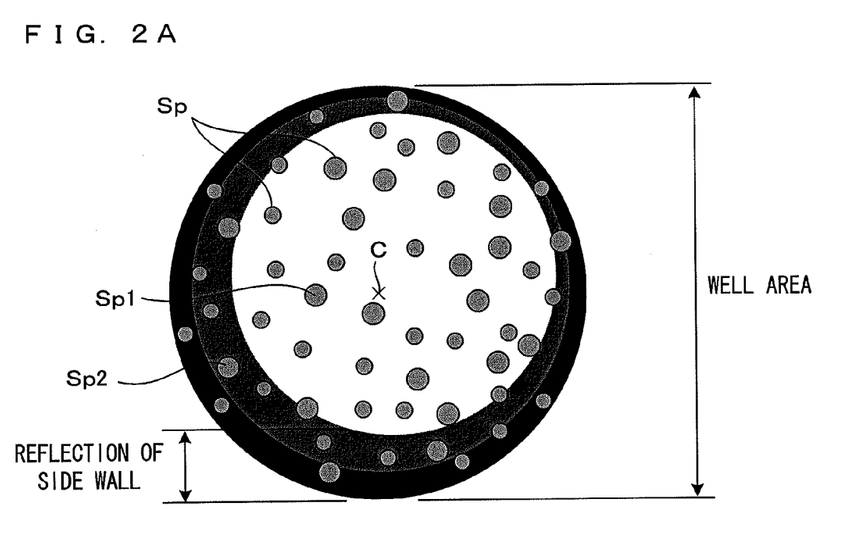
FIGS. 2A to 2C are diagrams which illustrate an imaging result for one well.

FIGS. 2A to 2C are diagrams which illustrate an imaging result for one well. As described above, the imaging is performed by allowing light to be incident from above the well W and receiving the light transmitted downward from the bottom surface of the well W in this embodiment. In this case, as shown in FIG. 2A, the shadow of the side wall surface of the well W, particularly the well-side wall surface above the surface of the fluid poured into the well W may be reflected in an well area of an image corresponding to the well W due to the influence of refraction caused by the meniscus of the fluid level. This influence is particularly notable when the well wall surface is made of an opaque material. Such a shadow overlaps images of cell clumps Sp to be detected, whereby the cell clumps Sp may be covered and detection accuracy may be reduced.

Figure 2B:
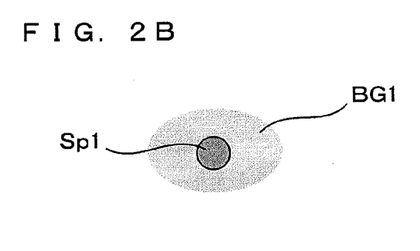
Figure 2C:
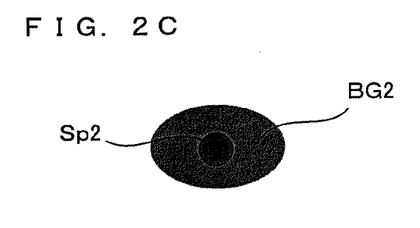

More specifically, when it is tried to digitize and quantitatively calculate a degree of shading of each cell clump Sp, a calculated density value of each cell clump Sp may include an error due to the influence of shading of a background part. For example, if the cell clump Sp itself to be calculated is relatively light, as shown in FIG. 2B, a light cell clump Sp1 existing together with a light background part BG1, i.e. with high lightness looks relatively light. On the other hand, as shown in FIG. 2C, a cell clump Sp2 existing together with a dark background part BG2, i.e. with low lightness looks relatively dark due to the influence of the background. Thus, there may be cases where calculation results on the density values of two cell clumps Sp1, Sp2 originally having the same density largely differ.

In the density value detection method according to this invention, a calculation error resulting from such shading of the background is suppressed by calculating a density value of the cell clump Sp to be detected based on the following principle.

Figure 3:
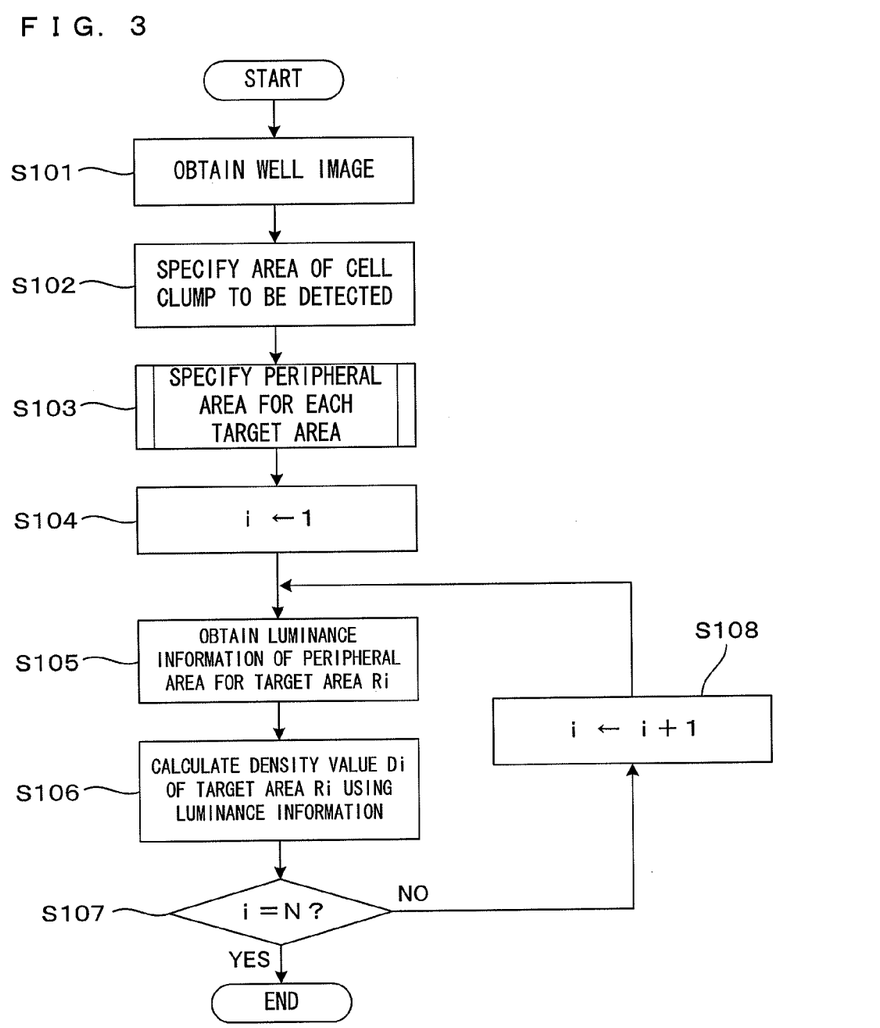
FIG. 3 is a flow chart which shows a density value detection method according to this invention.

FIG. 3 is a flow chart which shows a density value detection method according to this invention. First, images of wells to be processed are obtained (Step S101). The well images may be obtained by operating the imaging unit 13 to image the wells W or by retrieving image data obtained in advance and stored in the storage 115. Out of the thus obtained well images, an area of a cell clump to be detected for the calculation of a density value is specified (Step S102).

A method for specifying an area to be detected (hereinafter, referred to as a target area) is arbitrary, but the target area may be, for example, detected as follows. First, an original image is smoothed to generate a background image. The luminance of the background image is subtracted from the luminance of the original image pixel by pixel. The respective pixels after subtraction are binarized using a suitable threshold value. Out of areas continuously enclosed by pixels with high density, i.e. pixels whose luminance is lower than the threshold value, areas whose area is within a predetermined range is specified as target areas. By doing so, the areas of a predetermined size having a density higher than an average density in the image are specified as the target areas. It is assumed that the number of the specified target areas is N.

Subsequently, a peripheral area surrounding the target area is specified for each target area specified in this way (Step S103). The peripheral area is, for example, specified as follows.

Figure 4:
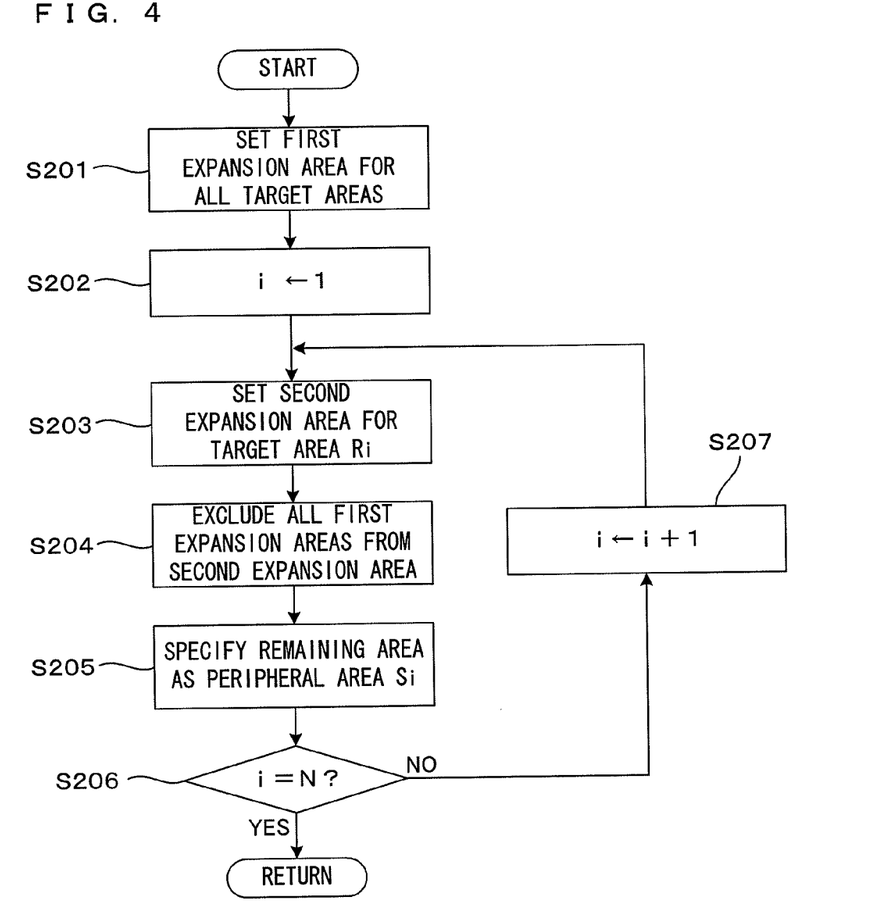
FIG. 4 is a flow chart which shows an example of a periphery specification process of specifying the peripheral area.
Figure 5A:
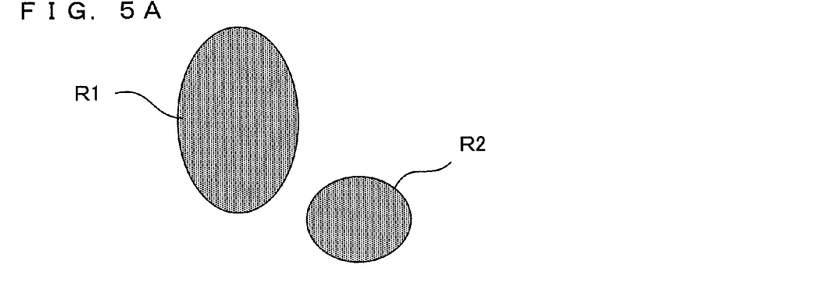
FIGS. 5A to 5D are views which diagrammatically show its processing contents.
Figure 5B:
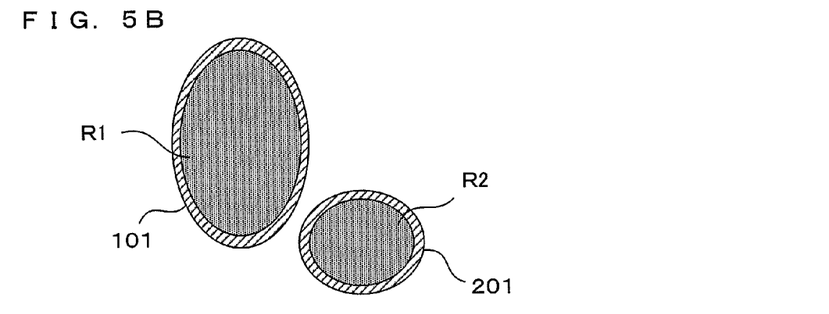
Figure 5C:
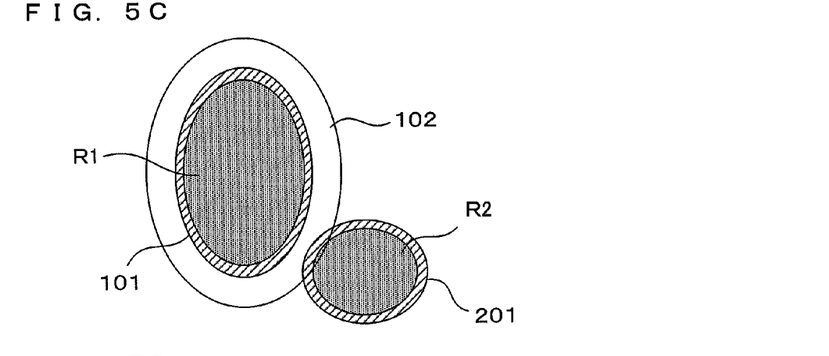
Figure 5D:
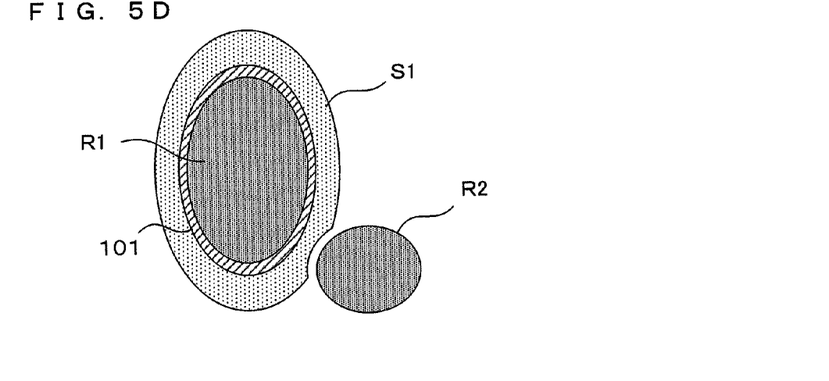

FIG. 4 is a flow chart which shows an example of a periphery specification process of specifying the peripheral area. FIGS. 5A to 5D are views which diagrammatically show its processing contents. First, a first expansion area is set for all the target areas specified as described above (Step S201). A case is thought where two target areas R1, R2 proximate to each other are specified as shown in FIG. 5A. The first expansion area is an area obtained by expanding the outer contour edge of each of the target areas R1, R2 outwardly by a constant width (first expansion amount) as shown by hatching in FIG. 5B. In FIGS. 5B to 5D, the first expansion area corresponding to the target area R1 is denoted by 101 and that corresponding to the target area R2 is denoted by 201. A process of "expanding" an area can be realized, for example, by calculating a set of points located within a distance range obtained by adding a constant amount to distances from the center of gravity of the area to the respective points on the outer edge or a set of points located within a distance range obtained by multiplying distances from the center of gravity of the area to the respective points on the outer edge by a constant scale factor.

How much each detection target area is to be expanded in specifying the peripheral area is arbitrary. With the aim of grasping the background density of the detection target area and because of a complicated process due to penetration of many other detection target areas, the peripheral area is preferably about equal to or less than, for example, the size of this target area. For example, the above "constant scale factor" may be set at a numerical value larger than 1 and not more than 2.

Subsequently, the peripheral area is specified for each target area Ri (i=1, 2, . . . , N). The peripheral area is an area surrounding the target area Ri on the image and used to obtain luminance information of the background of this target area. First, an internal parameter i is set at 1 (Step S202) and a second expansion area is set for the i-th target area Ri (Step S203). As denoted by 102 in FIG. 5C, the second expansion area corresponding to the first target area R1 is an area obtained by expanding the outer contour edge of this target area R1 outwardly by a constant width (second expansion amount) larger than the first expansion amount.

The target area Ri and the first expansion area corresponding to the target area Ri are excluded from the second expansion area corresponding to the target area Ri. Further, another specified target area and its corresponding first expansion area are also excluded (Step S204) and the remaining area is specified as the peripheral area Si for this target area Ri (Step S205). If there are other target areas around the target area Ri, these target areas and their first expansion areas are also excluded.

In this example, as shown in FIG. 5C, the second expansion area 102 of the target area R1 partly overlaps another target area R2 and its first expansion area 201. Thus, as shown in FIG. 5D by hatching with less dense dots, a peripheral area S1 specified in correspondence with the target area R1 is an area obtained by excluding this overlapping part from the second expansion area 102.

This is done for the following reason. First, in an image obtained by imaging a cell clump, the outer edge of the cell clump may not be necessarily clear. Due to this and a calculation result of an average value in the binarization technique described above, the contour of a specified target area and that of the original cell clump may deviate from each other. In view of this, the area (first expansion area 101) slightly outside the contour specified as the outer edge of the target area R1 is treated as an area with a remaining possibility of being actually included in the target area R1. That is, this area 101 is not included in the peripheral area S1 and only the area in the second expansion area 102 outside the area 101 is included in the peripheral area S1. By doing so, it is avoided that the luminance of a part that is actually a portion of the target area R1 is erroneously included in the calculation of the luminance of the peripheral area.

On the other hand, the other target area R2 present in proximity to this target area R1 should also not be treated as the background of this target area R1. The outer edge of the other target area R2 may also be unclear. Accordingly, the other target area R2 and its first expansion area 201 are also excluded and the remaining area is determined as the peripheral area S1 of the target area R1. By doing so, it is avoided that the luminances of adjacent other cell clumps are erroneously included in the calculation of the luminance of the peripheral area.

In the expansion method described above, the first expansion area 101 formed by expanding the target area R1 includes the target area R1 itself. This also holds for the target area R2. Accordingly, in specifying a peripheral area Si of a certain target area Ri, the processing content that "this target area, the other target areas and the first expansion areas of all the target areas are excluded from the second expansion area of this target area" is substantially equivalent to mere "exclusion of the first expansion areas of all the target areas from the second expansion area of this target area".

After the peripheral area S1 of the target area R1 is specified in this way, the above process is repeated (Steps S206, S207) until the total number N of the target areas is reached while the parameter i is incremented by 1, whereby the peripheral areas Si are specified for all the target areas Ri. The peripheral area of one target area and that of another target area may partly overlap, but each peripheral area is made not to include the other target area and its first expansion area. By doing so, the influence of the other target areas in evaluating the background density of the target area can be avoided.

Referring back to FIG. 3, the density value detection method is further described. When the peripheral area of each target area is specified as described above, a density value of each target area is then calculated based on luminance information of this target area and luminance information of the peripheral area of this target area. Specifically, a density value Di is calculated for all the target areas Ri by repeating the following process (Step S105, S106) until the total number N of the target area is reached while the parameter i is increased by 1 from 1 (Steps S104, S107, S108).

The density value is calculated as follows. First, the luminance information of the peripheral area Si of the target area Ri is obtained (Step S105). More specifically, luminance values of all the pixels in the peripheral area Si are averaged and this average value is set as luminance information Bsi of this peripheral area Si.

Subsequently, for the j-th (j=1, 2, . . . ) pixel Pij in the target area Ri, a density value Dij of this pixel Pij is calculated based on a luminance value (luminance information) Brij of this pixel and the previously calculated luminance information Bsi of the peripheral area Si (Step S106). More specifically, the density value Dij is calculated by the following equation:

$$Dij = W1 \times |Brij - W2 \times Bsi| \quad \text{(Equation 1)}$$

Then, an average value of the density values Dij of all the pixels in the target area Ri is set as the density value Di of this target area Ri. Note that the density values Dij of the respective pixels Pij calculated here are preferably saved and stored, for example, in the storage 115, even after the calculation of the density value Di. Because they can be, for example, used in applications such as mapping display of a density distribution in the image.

Here, W1, W2 are appropriately determined coefficients, wherein the coefficient W1 is a proportionality coefficient for converting the luminance value in image data into a density value and the coefficient W2 is a weight coefficient indicating a degree of contribution of the background density to the target area Ri. These coefficients are set to absorb the influence of the well side wall based on the knowledge that a degree of influence of the well side wall differs depending to the type of cells to be detected and the structure of their cell clumps. By using the above (Equation 1) taking this into consideration, the density value of each target area can be accurately calculated by eliminating the influence of the well wall surface in this detection method. A method for optimizing these coefficients is described next.

The coefficient optimization method described below is based on an experimental fact that three-dimensional structures of cell clumps formed in the same cultural environment are substantially the same if plane information (e.g. area taken up in the image) of the clump is the same. For example, in the case of cells forming a spherical clump, the thickness is known to increase in proportion to the area.

Further, it is empirically found that the influence of the well wall surface given to the calculation result of the density value can be particularly reduced when the coefficients W1, W2 are expressed as functions of the luminance information Bsi of the peripheral area Si without being set as constants. Accordingly, the coefficients W1, W2 can be expressed, for example, by the following equations:

$$W1 = a1 \times Bsi + b1 \quad \text{(Equation 2)}$$

$$W2 = a2 \times Bsi + b2 \quad \text{(Equation 3)}.$$

Here, a1, a2, b1 and b2 are appropriate parameters, and the coefficients W1, W2 are optimized by optimizing these parameters.

Note that, for the coefficient optimization method described below, all the processings may be realized by a computer or the like (e.g. control unit 10 of the detecting apparatus 1) or may partly depend on the operation of the operator. In the case of automating all the processings, a burden on an operator can be reduced. However, at the present time, a better result is achieved in some cases if judgment of this type is left to manual work of a skilled operator. Accordingly, operation input of the operator may be required, for example, for the extraction of the target area, fine adjustments of the parameters, etc.

Figure 6:
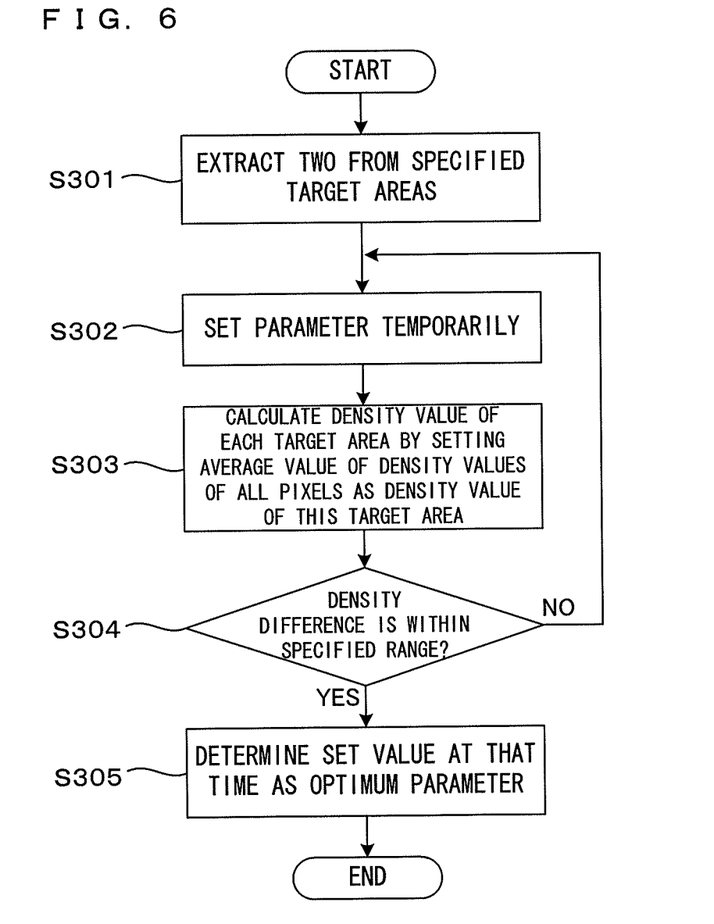
FIG. 6 is a flow chart which shows the coefficient optimization method.

FIG. 6 is a flow chart which shows the coefficient optimization method. First, two target areas are extracted from an original image obtained by imaging a well W (Step S301). The two target areas to be extracted preferably have about the same area in the image. Since the color and thickness are thought to be about the same if the area is about the same, the accuracy of the optimization can be increased by comparing the two areas having about the same structures.

Further, it is preferable to select two target areas having different degrees of influence of the wall surface. As shown in FIG. 2A, the degree of influence of the well wall surface on the original image differs depending on the position. Particularly, the influence is less in a central part of the well while being more in a peripheral part. By extracting two target areas having different degrees of influence of the wall surface such as two target areas Sp1, Sp2 respectively located near the center and the outer periphery of the well in FIG. 2A and optimizing the parameters, the universality of the parameters can be improved and the density values can be more accurately calculated.

Specifically, it is thought to extract, for example, one target area near the central part of the well and one target area near the peripheral part. In this sense, it is possible to adopt a method for extracting two target areas having about the same area and different distances from a center C (FIG. 2A) of the well. Further, two target areas largely different in background luminance may be extracted. In this sense, two target areas, a difference in luminance information between the peripheral areas corresponding to which is equal to or more than a predetermined value, may be selected.

When the two target areas are selected in this way, the parameters a1, a2, b1 and b2 in the above Equation 2 and Equation 3 are temporarily set at appropriate values (Step S302), and the density value is calculated based on the above Equation 1 for each of the two target areas (Step S303). More specifically, the density value Dij is calculated by applying the Equation 1 to each pixel Pij in each target area and an average value of these is set as the density value Di of this target area, whereby the density value of each target area is obtained.

A difference between the density values of the two target areas thus calculated is calculated, and the Equation 2 and Equation 3 expressing the coefficients W1 and W2 are determined using the set values of the parameters at that time as optimal values if the calculated difference is within a specified range determined in advance (Step S304). On the other hand, if the density value difference is beyond the specified range, this process returns to Step S302 and the temporary setting of the parameters and the calculation of the density values described above are repeatedly performed. Note that when the temporarily setting of the parameters is automated, values may be so selected as to minimize a difference between two density values from more various combinations of parameters.

In the above manner, the parameters a1, a2, b1 and b2 are optimized and the coefficients W1, W2 optimal to eliminate the influence of the well wall surface can be determined. The parameter optimization process is preferably performed for each type of cells to be detected. For example, in the case of a cell growth inhibition test, parameters need not necessarily be changed for a change in concentration of drug, but it is preferable to optimize the parameters anew in the case of changing a species of cell.

Further, parameter optimization needs not be performed in an apparatus currently in operation. For example, a plurality of sets of empirically obtained parameters may be stored before the shipment of an apparatus and a suitable set may be selected and applied from these sets depending on the intended use. Further, a set of parameters suitable for new targets may be provided by an updating operation of supplementing data to an already shipped apparatus.

Figure 7A:
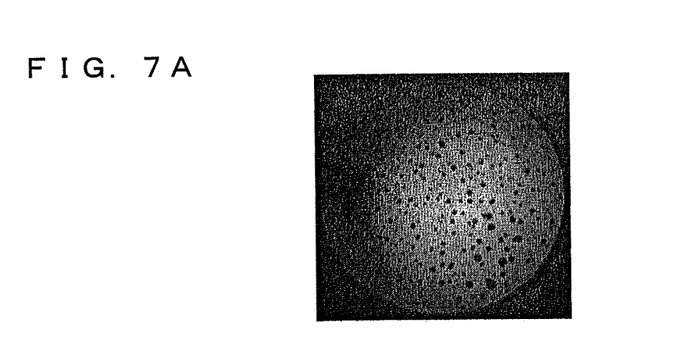
FIGS. 7A to 7D are pictures which show examples of the calculation result of the density value by the detection method of this embodiment.
Figure 7B:
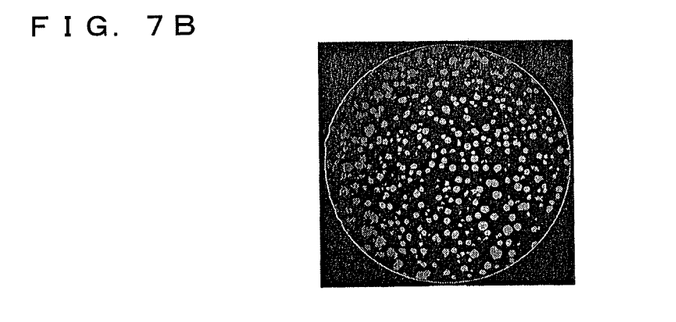
Figure 7C:
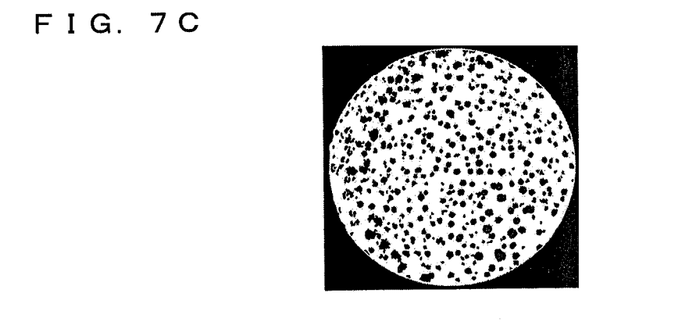
Figure 7D:
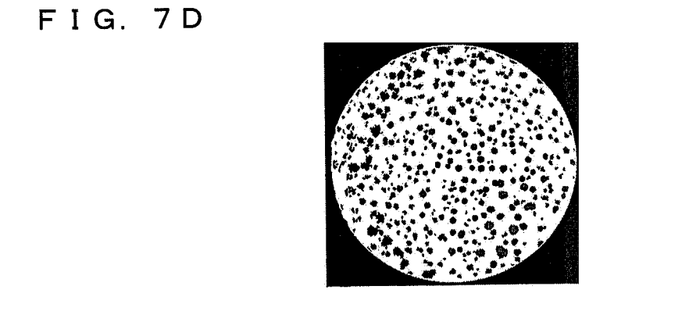

FIGS. 7A to 7D are pictures which show examples of the calculation result of the density value by the detection method of this embodiment. Here, FIG. 7A shows an imaged original image. FIG. 7B shows a background image in which portions of the respective target areas detected by the binarization of the image are painted with luminance of peripheral areas and the areas other than the target areas are blacked out (luminance value of 0). Further, FIG. 7C shows an image mapped using the density value of each pixel calculated by setting the parameters in the above Equation 2 and Equation 3 at standard preset values, and FIG. 7D shows an image mapped using a density value calculated based on the optimized parameters.

Although it is difficult to visually confirm the target areas in the original image shown in FIG. 7A, particularly in the peripheral part, it is easy to grasp the distribution of the target areas and the sizes of the respective areas as a result of the detection by binarization in the background image shown in FIG. 7B. If the extraction of the target areas used for coefficient optimization is left to the operator, the extraction operation by the operator can be supported by displaying, for example, this background image on the display 15.

In the image shown in FIG. 7C on which the parameter optimization is not performed, the densities of the respective detected target areas are expressed, but the densities of the target areas are shown to be higher (i.e. lower luminance) in a part subject to the influence of the well wall surface such as a left end part of FIG. 7C than in other parts and it can be understood that the influence of the well wall surface cannot be sufficiently eliminated from the density values of the detected target areas. Contrary to this, in the image shown in FIG. 7D on which the parameter optimization is performed, differences in density between the target areas distributed in a central part of the image and those distributed in a peripheral part are reduced and it can be said that the influence of the well wall surface is suppressed more. In an example of actual measurement values, a density difference between two target areas that is 1.8, for example, in calculation assuming the luminance value of the original image before the processing as the density value is confirmed to be reduced to 1.1 using the density values calculated by performing the coefficient optimization.

As described above, in this embodiment, a density value is calculated including not only luminance information of a target area, but also luminance information of a peripheral area surrounding the target area in calculating a density value of an area corresponding to a detection target such as a cell or a cell clump from an original image obtained by imaging the well provided on the microplate. By doing so, the density value of the target area can be accurately calculated by canceling the influence of the well wall surface appearing on the target area and the peripheral area.

Specifically, a value obtained by subtracting a value obtained by multiplying average luminance information of the peripheral area by a predetermined weight coefficient from luminance information of each pixel in the target area and multiplying the absolute value of this difference by a predetermined coefficient is set as the density value of the pixel. Further, an average value of these is set as the density value of this target area. Furthermore, these coefficients are set according to the luminance information of the peripheral area. In this way, the influence of the well wall surface appearing in the background can be effectively eliminated and the density value of the target area can be accurately calculated.

In specifying the peripheral area, an adjacent area very close to the outer edge of the target area is excluded and a part overlapping another target area and its adjacent area is also excluded. By doing so, the influence of these areas on the calculation result can be prevented even if the outer edge of the specified target area is unclear or another target area is located at a proximate position.

Further, the coefficients used for calculation are optimized to reduce a difference in the density value between two target areas having different degrees of influence of the well wall surface extracted from an actually imaged original image. Therefore, the density values of the respective target areas having different degrees of influence of the well wall surface can be respectively accurately calculated.

As described above, in this embodiment, the microplate M corresponds to a "specimen holding plate" of the present invention and the well W corresponds to a "depressed part". Further, the target area Ri corresponds to a "detection target area" of the present invention, whereas the peripheral area Si corresponds to a "peripheral area" of the present invention.

Further, in the above embodiment, Steps S101 and S102 of FIG. 3 respectively correspond to a "first step" and a "second step" of the present invention. Further, Steps S103 and S105 correspond to a "third step" of the present invention. Further, Step S106 corresponds to a "fourth step" of the present invention. Further, the coefficient optimization process shown in FIG. 6 corresponds to a "fifth step" of the present invention.

Note that the present invention is not limited to the above embodiment and various changes other than the above ones can be made without departing from the gist of the present invention. For example, the above embodiment includes the imaging unit 13 for imaging the wells formed on the microplate, but it is not essential for a device which performs the density value detection method according to the present invention to have an imaging function. For example, the present invention can be applied also to a processing device which does not have an imaging function itself and performs the above process by receiving an image imaged by another imaging device. In this sense, hardware for carrying out the present invention may be a general-purpose computer.

Further, although the coefficients used in the calculation of the density value are not constants but the functions of the luminance information of the peripheral area in the above embodiment, this is not an essential requirement. For example, by using the coefficients appropriately optimized for a species of cell, imaging conditions or the like, sufficient calculation accuracy may be achieved even if the coefficients are constants. Further, although the coefficients are linear functions of the luminance information of the peripheral area, there is no limitation to this.

Further, although the first expansion area is excluded from the peripheral area to eliminate a calculation error resulting from the unclarity of a boundary between each detection target area and its background in the above embodiment, this is not an essential requirement. If the boundary between the detection target area and its background is clear, for example, such as when the image density of a cell to be detected is high and the contour is clear, a peripheral area including an area adjacent immediately outside the specified detection target area may be set. For example, an area obtained by extruding the detection target area and a part overlapping adjacent another detection target area from an expansion area obtained by expanding this detection target area by a predetermined expansion amount can be set as a peripheral area of this case.

Further, in the above embodiment, the density value of each target area is calculated using the luminance information of the peripheral area of this target area. However, a common value, e.g. an average luminance of all the peripheral areas or the luminance of the peripheral area having the highest luminance (this means the peripheral area least subject to the influence of the well wall surface) may be used as the luminance information of the peripheral area used in the calculation for different target areas. However, in this case, the coefficients are preferably set as the functions of the peripheral area to reflect background density differences of the respective target areas on the calculation result.

For example, if Bsmax denotes the maximum value of the luminance information of the peripheral areas Si of the respective target areas Ri (i.e. luminance information of the peripheral area having the highest luminance), the density value of each pixel may be calculated as Dij using the following Equation:

$$Dij = W1 \times |Brij - Bsmax| \quad \text{(Equation 4).}$$

The coefficient W1 at this time is a function of the luminance information Bsi of the peripheral area Si of each target area Ri, but its value or the Equation is different from the coefficient W1 in the (Equation 1).

Further, although the parameters are optimized by comparing the density values for one pair of (two) target areas extracted from the original image in the coefficient optimization process of the above embodiment, the parameters may be optimized by comparing more pairs of target areas.

This invention can be particularly suitably applied to a technology for imaging a specimen holding plate including depressed parts such as a microplate, for example, used in the medical and bioscience fields and detecting the density of a detection target, but its fields of application are not limited to the medical and bioscience fields.

In the third step of the detection method of the present invention, for example, an area obtained by excluding a first expansion area of the detection target area obtained by expanding the contour of the detection target area outwardly by a first expansion amount from a second expansion area obtained by expanding the contour of the detection target area outwardly by a second expansion amount larger than the first expansion amount may be set as the peripheral area. In this case, an adjacent area immediately outside the area specified as the detection target area is excluded from the peripheral area and an area surrounding the detection target area at a short distance from the outer edge of the detection target area is treated as the peripheral area.

In the present invention, if the luminance of the detection target area itself is reflected on the luminance information of the peripheral area in the case of calculating the density value of the detection target area utilizing the luminance information of the peripheral area, it causes a calculation error. In an image in which boundaries between detection target areas and areas adjacent thereto are not clear, the contour of a specified detection target area may be slightly deviated from the original boundary. This causes the above calculation error. By excluding areas adjacent to the detection target area from the peripheral area, the inclusion of the peripheral part of the detection target area in the peripheral area can be avoided and calculation accuracy can be improved even if the boundary is not clear.

Further, in the third step of the present invention for example, an area obtained by excluding a first expansion area of the detection target area obtained by expanding the contour of the detection target area outwardly by a first expansion amount and a first expansion area of another detection target area different from the detection target area obtained by expanding the other detection target area by the first expansion amount from a second expansion area obtained by expanding the contour of the detection target area outwardly by a second expansion amount larger than the first expansion amount may be set as the peripheral area. Since the first expansion area of another detection target area located at a proximate position may possibly include a part of another detection target area, the inclusion of the other detection target area in the peripheral area can be avoided and the calculation accuracy can be further improved by also excluding this area.

Further, in the third step for example, an area obtained by excluding the detection target area from an expansion area obtained by expanding the contour of the detection target area outwardly may be set as the peripheral area. Since a degree of influence of the wall surface of the depressed part differs depending on the position, the density value can be more accurately calculated by setting only the area adjacent to the detection target area as the peripheral area as described above.

Further, in the detection method of the present invention, for example, when a specified area as the peripheral area for one detection target area includes the other detection target area in the third step, an area obtained by excluding an area overlapping another detection target area from the specified area may be set as the peripheral area. As described above, if the luminance of the detection target area influences the luminance information of the peripheral area, it causes a calculation error. This holds true also when the luminance of another detection target area also influences. By excluding the other detection target area from the peripheral area, the density values of the respective detection target areas can be more accurately calculated.

Further, for example, in the fourth step, the density value may be calculated for each pixel in the detection target area using the luminance of the pixel as luminance information. By doing so, the luminous information at each position in the detection target area can be obtained pixel by pixel, which can be useful in various analyses.

Further, for example, in the third step, an average value of the luminance in the peripheral area may be set as the luminance information of the peripheral area.

Further, for example, in the fourth step, the density value of the detection target area may be calculated based on a difference between the luminance information of the detection target area and a value obtained by multiplying the luminance information of the peripheral area by a predetermined weight coefficient. By subtracting the density of the peripheral area from the density detected in the detection target area, it is possible to calculate the density value of the detection target area by canceling the influence of the wall surface of the depressed part appearing in the detection target area and the peripheral area. At this time, the influence of the wall surface of the depressed part is not necessarily the same in the detection target area and the peripheral area. The influence of the wall surface of the depressed part can be more effectively eliminated by calculating a difference while appropriately weighting either one of the luminance information of the detection target area and that of the peripheral area. In this case, for example, the weight coefficient may be determined according to the luminance information of the peripheral area. According to the knowledge of the present inventors, a calculation error can be suppressed by doing so.

Further, for the weight coefficient for example, a fifth step may be provided which optimizes the weight coefficient, for example, so that a difference between density values calculated for two different detection target areas detected in the detection target area specifying step is equal to or less than a predetermined threshold value. If the difference between the density values respectively calculated in the two different detection target areas is sufficiently small, the setting of the weight coefficient can be said to be proper. By evaluating and optimizing the weight coefficient in this way, calculation accuracy can be further improved.

More specifically, for example, in the fifth step, the density values may be respectively calculated by performing the fourth step using the weight coefficient temporarily set for the two detection target areas repeatedly while changing the weight coefficient until a difference between the density values of the two detection target areas becomes equal to or less than the threshold value. By calculating the density values of the two detection target areas while changing the weight coefficient and reducing the difference thereof in this way, the weight coefficient can be optimized.

In these cases, the two detection target areas may be, for example, so selected that the distances from the center of the depressed part in the original image are different. In the fifth step above, the larger the difference in the degree of influence of the wall surface of the depressed part between the used two detection target areas, the higher the optimization accuracy. The influence of the wall surface of the depressed part tends to be about the same at positions substantially equidistant from the center of the depressed part in the original image. Accordingly, if two detection target areas having different distances from the center of the depressed part are selected, for example, such as those near the center of the depressed part and near the outer periphery, the detection target areas largely different in the degree of influence of the wall surface of the depressed part are selected. In this way, the weight coefficient can be more accurately optimized, with the result that the calculation accuracy of the density values of the detection target areas can be improved.

Alternatively, the two detection target areas may be, for example, so selected that a difference in luminance information between peripheral areas corresponding to the respective detection target areas is equal to or more than a predetermined value. In this case as well, the weight coefficient is optimized using two detection target areas having different degrees of influence of the wall surface of the depressed part, wherefore the weight coefficient can be optimized and accuracy in the calculation of the density values can be improved.

Although the invention has been described with reference to specific embodiments, this description is not meant to be construed in a limiting sense. Various modifications of the disclosed embodiment, as well as other embodiments of the present invention, will become apparent to persons skilled in the art upon reference to the description of the invention. It is therefore contemplated that the appended claims will cover any such modifications or embodiments as fall within the true scope of the invention.

What is claimed is:

1. A density detection method for detecting a density value of an area having a peculiar optical property within an image, comprising:
    a first step of irradiating light from above a specimen holding plate including a plurality of light transmissive depressed parts and receiving the light transmitted to a lower side of the specimen holding plate, thereby imaging an original image including the depressed parts;
    a second step of specifying an area having an optical property different from a surrounding area as a detection target area from an image area corresponding to the depressed part of the original image;
    a third step of specifying a peripheral area surrounding the detection target area in the original image and obtaining luminance information of the peripheral area; and
    a fourth step of calculating a density value of the detection target area based on luminance information of the detection target area and luminance information of the peripheral area corresponding to the target area,
    wherein, in the third step, an area obtained by excluding a first expansion area of the detection target area obtained by expanding the contour of the detection target area outwardly by a first expansion amount from a second expansion area obtained by expanding the contour of the detection target area outwardly by a second expansion amount larger than the first expansion amount is set as the peripheral area.

2. The detection method according to claim 1, wherein, in the fourth step, the density value is calculated using a luminance of a pixel as the luminance information for each pixel in the detection target area.

3. The detection method according to claim 1, wherein, in the third step, an average value of the luminance in the peripheral area is used as the luminance information of the peripheral area.

4. A density detection method for detecting a density value of an area having a peculiar optical property within an image, comprising:
    a first step of irradiating light from above a specimen holding plate including a plurality of light transmissive depressed parts and receiving the light transmitted to a lower side of the specimen holding plate, thereby imaging an original image including the depressed parts;
    a second step of specifying an area having an optical property different from a surrounding area as a detection target area from an image area corresponding to the depressed part of the original image;
    a third step of specifying a peripheral area surrounding the detection target area in the original image and obtaining luminance information of the peripheral area; and
    a fourth step of calculating a density value of the detection target area based on luminance information of the detection target area and luminance information of the peripheral area corresponding to the target area,
    wherein, in the third step, an area obtained by excluding a first expansion area of the detection target area obtained by expanding the contour of the detection target area outwardly by a first expansion amount and a first expansion area of another detection target area different from the detection target area obtained by expanding the other detection target area by the first expansion amount from a second expansion area obtained by expanding the contour of the detection target area outwardly by a second expansion amount larger than the first expansion amount is set as the peripheral area.

5. A density detection method for detecting a density value of an area having a peculiar optical property within an image, comprising:
    a first step of irradiating light from above a specimen holding plate including a plurality of light transmissive depressed parts and receiving the light transmitted to a lower side of the specimen holding plate, thereby imaging an original image including the depressed parts;
    a second step of specifying an area having an optical property different from a surrounding area as a detection target area from an image area corresponding to the depressed part of the original image;
    a third step of specifying a peripheral area surrounding the detection target area in the original obtaining luminance information of the peripheral area; and
    a fourth step of calculating density value of the detection target area based on luminance information of the detection target area and luminance information of the peripheral area corresponding to the target area,
    wherein, when a specified area as the peripheral area for one detection target area includes the other detection target area in the third step, an area obtained by excluding an area overlapping another detection target area from the specified area is set as the peripheral area.

6. A density detection method for detecting a density value of an area having a peculiar optical property within an image, comprising:
- a first step of irradiating light from above a specimen holding plate including a plurality of light transmissive depressed parts and receiving the light transmitted to a lower side of the specimen holding plate, thereby imaging an original image including the depressed parts;
- a second step of specifying an area having an optical property different from a surrounding area as a detection target area from an image area corresponding to the depressed part of the original image;
- a third step of specifying a peripheral area surrounding the detection target area in the original image and obtaining luminance information of the peripheral area; and
- a fourth step of calculating density value of the detection target area based on luminance information of the detection target area and luminance information of the peripheral area corresponding to the target area wherein, in the fourth step, the density value of the detection target area is calculated based on a difference between the luminance information of the detection target area and a value obtained by multiplying the luminance information of the peripheral area by a predetermined weight coefficient.

7. The detection method according to claim 6, wherein, in the fourth step, the weight coefficient is determined according to the luminance information of the peripheral area.

8. The detection method according to claim 6, further comprising a fifth step of optimizing the weight coefficient such that a difference between density values calculated for two different detection target areas detected in the second step is equal to or less than a predetermined threshold value.

9. The detection method according to claim 8, wherein, in the fifth step, the density values are respectively calculated by performing the fourth step using the weight coefficient temporarily set for the two detection target areas repeatedly while changing the weight coefficient until a difference between the density values of the two detection target areas becomes equal to or less than the threshold value.

10. The detection method according to claim 8, wherein the two detection target areas are so selected that the distances thereof from a center of the depressed part in the original image are different from each other.

11. The detection method according to claim 8, wherein the two detection target areas are so selected that a difference in the luminance information between the peripheral areas corresponding to the respective detection target areas is equal or more a predetermined value.

* * * * *